US012602817B2

(12) United States Patent
Moravchik et al.

(10) Patent No.: US 12,602,817 B2
(45) Date of Patent: Apr. 14, 2026

(54) SYSTEM AND METHODS FOR PROVIDING A USER KEY PERFORMANCE INDICATORS FOR BASKETBALL

(71) Applicant: SWISH BASKET, INC., Dover, DE (US)

(72) Inventors: Oren Moravchik, Tel Aviv (IL); Oren Sadeh, Tel Aviv (IL); Lior Moravtchik, Davie, FL (US)

(73) Assignee: SWISH BASKET, INC., Dover, DE (US)

( * ) Notice: Subject to any disclaimer, the term of this patent is extended or adjusted under 35 U.S.C. 154(b) by 8 days.

(21) Appl. No.: 17/723,350

(22) Filed: Apr. 18, 2022

(65) Prior Publication Data

US 2022/0241671 A1      Aug. 4, 2022

Related U.S. Application Data

(63) Continuation of application No. 16/490,601, filed as application No. PCT/IL2018/050233 on Mar. 1, 2018, now Pat. No. 11,305,176.

(Continued)

(51) Int. Cl.
| | |
|---|---|
| *A63F 13/00* | (2014.01) |
| *A63B 24/00* | (2006.01) |
| *A63B 63/08* | (2006.01) |
| *A63B 71/06* | (2006.01) |
| *G06T 7/20* | (2017.01) |
| *G06T 7/73* | (2017.01) |

(Continued)

(52) U.S. Cl.
CPC ........... *G06T 7/73* (2017.01); *A63B 24/0021* (2013.01); *A63B 63/083* (2013.01); *A63B 71/0622* (2013.01); *G06T 7/20* (2013.01);

*G06V 20/00* (2022.01); *G06V 20/64* (2022.01); *A63B 2024/0034* (2013.01); *A63B 2071/0625* (2013.01); *A63B 2071/0694* (2013.01); *A63B 2220/40* (2013.01); *A63B 2220/805* (2013.01); *A63B 2243/0037* (2013.01); *G06T 2207/10024* (2013.01); *G06T 2207/10028* (2013.01); *G06T 2207/30241* (2013.01); *G06V 10/62* (2022.01)

(58) Field of Classification Search
None
See application file for complete search history.

(56) References Cited

U.S. PATENT DOCUMENTS

| | | | |
|---|---|---|---|
| 4,893,182 A | 1/1990 | Gautraud |
| 5,064,195 A | 11/1991 | McMahan |

(Continued)

OTHER PUBLICATIONS

U.S. Appl. No. 63/789,368, filed May 14, 2002, Hampton.

*Primary Examiner* — Paul A D'Agostino
(74) *Attorney, Agent, or Firm* — Sterne, Kessler, Goldstein & Fox P.L.L.C.

(57) ABSTRACT

The disclosure is directed to systems and methods for providing a user with key performance indicators of a basketball player relating to accuracy, precision and improvement. Specifically, the disclosure is directed to a system of sensors coupled to a basketball backboard adapted to provide an accurate tracking of a shot in a given three-dimensional space and extract features manipulated to yield key performance indicators based on establishing whether, how often and where the ball center passes the rim plane at a sub-cm resolution over a period of no more than 200 msec.

16 Claims, 9 Drawing Sheets

Related U.S. Application Data

(60) Provisional application No. 62/465,835, filed on Mar. 2, 2017.

(51) Int. Cl.

| | | |
|---|---|---|
| *G06V 20/00* | (2022.01) | |
| *G06V 20/64* | (2022.01) | |
| *G06V 10/62* | (2022.01) | |

(56) References Cited

U.S. PATENT DOCUMENTS

| | | | | |
|---|---|---|---|---|
| 5,365,427 | A | 11/1994 | Soignet | |
| 8,908,922 | B2 | 12/2014 | Marty | |
| 8,948,457 | B2 * | 2/2015 | Marty | H04N 23/51 |
| | | | | 463/2 |
| 9,734,405 | B2 | 8/2017 | Marty | |
| 9,901,801 | B2 * | 2/2018 | Thurman | G09B 19/0038 |
| 10,360,685 | B2 * | 7/2019 | Marty | G06T 7/285 |
| 2002/0049102 | A1 | 4/2002 | Taylor | |
| 2003/0073518 | A1 | 4/2003 | Marty et al. | |
| 2007/0064975 | A1 * | 3/2007 | Takanohashi | G06T 7/292 |
| | | | | 382/103 |
| 2007/0219025 | A1 | 9/2007 | Aberton | |
| 2008/0312010 | A1 | 12/2008 | Marty | |
| 2011/0143868 | A1 * | 6/2011 | Marty | A63B 63/083 |
| | | | | 473/447 |
| 2013/0095961 | A1 * | 4/2013 | Marty | A63B 24/0084 |
| | | | | 473/450 |
| 2014/0092253 | A1 * | 4/2014 | Marty | A63B 69/0071 |
| | | | | 473/448 |
| 2014/0200692 | A1 | 7/2014 | Thurman | |
| 2014/0222177 | A1 * | 8/2014 | Thurman | A63B 41/02 |
| | | | | 700/92 |
| 2014/0291480 | A1 * | 10/2014 | Bruder | G01S 17/89 |
| | | | | 250/206 |
| 2015/0062440 | A1 * | 3/2015 | Baxter | G06V 40/23 |
| | | | | 348/734 |
| 2015/0265897 | A1 * | 9/2015 | Gordon | A63B 63/083 |
| | | | | 473/447 |
| 2015/0290516 | A1 | 10/2015 | Joseph et al. | |
| 2015/0324636 | A1 * | 11/2015 | Bentley | A63F 13/212 |
| | | | | 386/227 |
| 2015/0326932 | A1 * | 11/2015 | Hill | H04N 21/8126 |
| | | | | 725/32 |
| 2016/0056014 | A1 * | 2/2016 | Yamamoto | H01J 37/222 |
| | | | | 250/307 |
| 2017/0169735 | A1 * | 6/2017 | Lablans | H04L 9/0841 |
| 2020/0009443 | A1 * | 1/2020 | Moravchik | G06V 20/64 |
| 2020/0368616 | A1 * | 11/2020 | Delamont | H04N 13/239 |
| 2022/0203178 | A1 * | 6/2022 | Burdette | A63B 24/0003 |
| 2022/0357440 | A1 * | 11/2022 | Hugmark | G01S 13/72 |
| 2023/0085842 | A1 * | 3/2023 | Hugmark | G06T 7/20 |
| | | | | 473/156 |
| 2023/0390604 | A1 * | 12/2023 | Hugmark | A63B 71/0622 |
| 2024/0312031 | A1 * | 9/2024 | Perry | G06T 7/292 |

* cited by examiner

SYSTEM AND METHODS FOR PROVIDING A USER KEY PERFORMANCE INDICATORS FOR BASKETBALL

CROSS REFERENCE TO RELATED APPLICATIONS

This application is a continuation of U.S. patent application Ser. No. 16/490,601 filed Sep. 3, 2019, granted as U.S. Pat. No. 11,305,176 on Apr. 19, 2022, which is incorporated herein by reference in its entirety. U.S. patent application Ser. No. 16/490,601 was a U.S. National Stage filing of commonly owned PCT Application No. PCT/IL2018/050233, filed Mar. 1, 2018, which is based on and claims the benefit of U.S. Provisional Patent Application Ser. No. 62/465,835, filed Mar. 2, 2017, both of which are further incorporated herein by reference i n their entirety.

BACKGROUND

The present disclosure relates to systems and methods for providing a user with key performance indicators of a basketball player relating to accuracy, precision and improvement. Specifically, the disclosure related to a system of sensors coupled to a basketball backboard adapted to provide an accurate tracking and/or tracing of a shot in a given volume and extract key performance indicators based on predetermined factors found to be pertinent for each key performance indicator selected.

To date the most prevalent statistic for players is shooting percentage whether sub divided to zones around the key or not. Furthermore, shooting arcs are typically not associated with the shot origin or the player physical characteristics (e.g., height).

Currently available systems are slow to produce and provide data, expensive and with low resolution in their ability to track the trajectory of the ball while in flight. These factors prevent these systems from being used reliably by referees during the game as well as having limited utility as a training tool for players and other professionals.

These and other aspects are addressed by the following systems and methods.

SUMMARY

Disclosed, in various embodiments, are systems of sensors coupled to a basketball backboard adapted to provide an accurate tracking and/or tracing of a shot in a given volume and extract key performance indicators based on predetermined factors found to be pertinent for each key performance indicator selected.

In an embodiment, provided herein is a system for providing key performance indicators (KPI) of a basketball player to a user, the system comprising: a transparent board having a front surface and a rear surface; a hoop operably coupled to the transparent board, wherein the hoop rim defines a plane that is substantially perpendicular to the board; a sensing module coupled to the rear surface of the board, wherein the sensing module is adapted to trace a course of a ball over a predetermined voxel; and a processing module, in communication with the display, the sensing module, the board and the rim, the processing module having a central processing unit in communication with at least a display and a non-volatile memory, having thereon a processor-readable medium with a set of executable instructions configured to, when executed, cause the processor to: track the course of the ball within the predetermined voxel;

determine the location of the center of the ball; trace the ball center within the predetermined voxel; determine the ball center location relative to the rim; determine the planar location on the rim plane where the ball center crosses; using the display, render the ball center course; and based on the ball center course, the rim and the plane, provide the user with a plurality of key performance indicators.

In another embodiment, provided herein is a method of providing a user with a key performance indicator of a basketball player, implementable in a system comprising a transparent board having a front surface and a rear surface; a hoop operably coupled to the transparent board, wherein the hoop rim defines a plane that is substantially perpendicular to the board; a sensing module coupled to the rear surface of the board, wherein the sensing module is adapted to trace a course of a ball over a predetermined voxel; and a processing module, in communication with at least one of the sensing module, the board and the rim, the processing module having a central processing unit in communication with a non-volatile memory having thereon a processor-readable medium with a set of executable instructions configured to, when executed, cause the processor to: track the course of the ball within the predetermined voxel; determine the location of the center of the ball; trace the ball center within the predetermined voxel; determine the ball center location relative to the rim; determine the planar location on the rim plane where the ball center crosses; render the ball center course; and based on the ball center course, the rim and the plane, provide the user with a plurality of key performance indicators, the method comprising: upon initiation by the user, tracking a ball course in a predetermined voxel; determining the ball temporospatial origin; calculating ball arc; determining a location where the ball center crosses the rim plane; and based on the ball center course, the rim and the plane, provide the user with a plurality of key performance indicators associated with the player.

In yet another embodiment, provided herein is a system to assist basketball game time administration, the system comprising: a transparent board having a front surface and a rear surface; a hoop operably coupled to the transparent board, wherein the hoop rim defines a plane that is substantially perpendicular to the board; a sensing module coupled to the rear surface of the board, wherein the sensing module is adapted to trace a course of a ball over a predetermined voxel; a basketball game time administration means; and a processing module, in communication with the basketball game time administration means, the sensing module, the board and the rim, the processing module having a central processing unit in communication with at least a display and a non-volatile memory, having thereon a processor-readable medium with a set of executable instructions configured to, when executed, cause the processor to: track the course of the ball within the predetermined voxel; determine the location of the center of the ball; trace the ball center within the predetermined voxel; determine the ball center location relative to the rim; determine the planar location on the rim plane where the ball center crosses the rim; plot a time versus location of the ball center in relation to the hoop rim; and once the ball passes the hoop rim entirely, communicate the time the ball passes the rim entirely to the basketball game time administration means.

In certain embodiments, the user is at least one of a basketball player, a referee, a coach, and a media announcer.

These and other features of the systems and methods for providing a user with a basketball player's KPI's, will become apparent from the following detailed description when read in conjunction with the drawings, which are exemplary, not limiting.

BRIEF DESCRIPTION OF THE FIGURES

For a better understanding of the systems and methods, with regard to the embodiments thereof, reference is made to the accompanying drawings, in which.

DESCRIPTION

Figure 1:
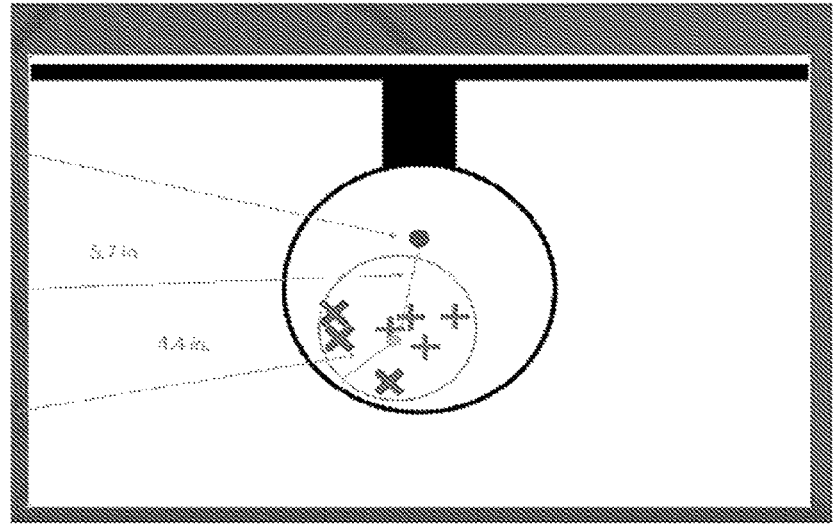
FIG. 1, illustrates output of the system allowing for grading subset of shots from a single origin.
Figure 2:
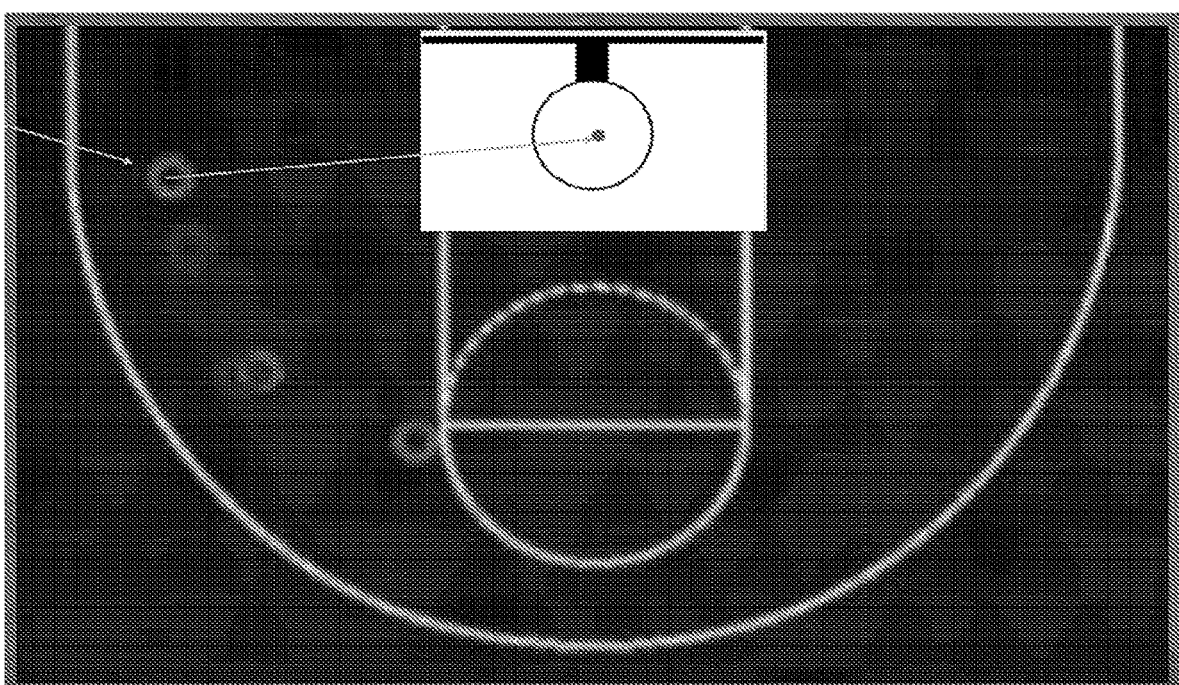
FIG. 2, illustrates output calculating optimal shot location for a player with a given arc.
Figure 3:
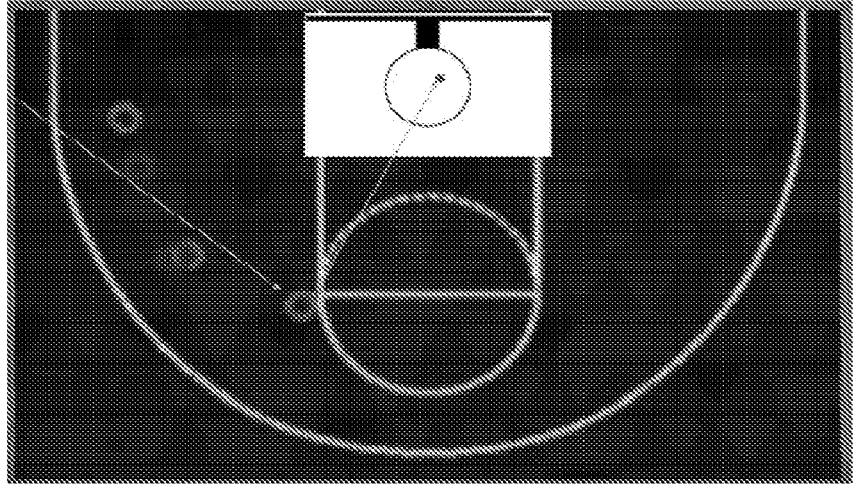
FIG. 3 illustrates output calculating optimal shot location for a different player with another arc angle.

Provided herein are embodiments of a system applying a unique data mining and data integration method for providing a user with key performance indicators relating to ball motion, accuracy, precision and improvement.

The disclosure is configured to give users real time, actionable, analyzed data set with which to make decisions during game time, as well as improve players' performance by measuring improvement against clear and measurable key performance indicators.

In addition, the systems and methods described herein can be used to assist referees in officiating games, by, for example determining whether shots were blocked (therefore showing deviation from the expected arc) before, upon or after achieving the arc apogee during a shot, or in circumstances where the ball's trajectory shows oscillating pattern indicative of board vibrations (in other words, goal tending), or in another embodiment, whether the rim/board was touched\shaken by the player. Moreover, the system could further communicate with a basketball game time administration means, such as at least one of a shot-clock, a stopwatch, a light switch, and a display. Upon determining the planar location on the hoop rim's plane where the ball center crosses the rim the system can plot a time versus location of the ball center in relation to the hoop rim and once the ball passes the hoop rim beyond a user-defined threshold, communicate that time to the basketball game time administration means, and stop the period allotted for the shot to take place (e.g., 24 sec.). It is noted, that currently, the determination is done manually by a referee, leading to inconsistencies and potential errors that in certain circumstances may prove crucial.

In an embodiment, the systems and methods provided herein are used for game officiating by providing at least one of: immediate data—allowing reducing the time to issuing a ruling (the system's response time is <200 msec., or less than 100 msec), accurate data—the location of the ball in 3D at high frames per second (FPS), which does not depend on any external factor to make any ruling (e.g., the system's output indicates 3D coordinates in, 10 mm precision or, in another example 5 mm precision, and data display and rendering, which can be shared with viewers and which will be ostensibly be accepted by these viewers (e.g., the shot's coordinates can easily be displayed using the 3D location data).

The features extracted from the data and used for officiating can be, for example; detecting ball deflection. The ball's path may pass an apex, may hit the backboard, may hit the rim, may pass above the rim's cylinder. Detecting each of these will allow determining whether a ball's deflection was legal or not. The rim, net or backboard may be vibrated by the player. If these actions are against regulation, using the system's depth data\accelerometer and correlating that with the ball's movement can allow the system to determine whether it was a goaltend. Furthermore, when a shot touches the rim, the shot clock should reset. Referees are sometimes required to decide whether the shot hit the rim or not. The system's data can be configured to provide this determination.

It was established, that once the accuracy in tracking shots, their course and the point at which the ball center breaks the rim plane is about 1 cm or better, the resulting data can create substantial value to players who wish to improve their shooting mechanics and to media broadcasters that wish to improve the fan experience.

An objective of the disclosure is to provide basketball players, their coaches and other interested professionals, with tools for monitoring and improving performance, such as shooting, for example; finding shooting errors, testing shooting techniques, employing advanced physical and mental practice methodologies and the like. Another objective is to provide basketball professionals and team professionals with tools for improving their shooting related decisions, for example; evaluating candidates with higher accuracy, making real-time game decisions based on accurate and relevant KPI's. Yet another objective is to provide basketball media and fans, with tools for improving the game experience, such as, for example by providing visual indication of shooting quality on every channel, providing advanced shooting statistics. Furthermore, the systems and methods disclosed herein can be used in yet another embodiment to provide improved shooting statistics in order to improve performance in fantasy leagues and betting.

In an embodiment, the methods and systems described herein are configured to provide analysts and researchers investigating sports in general and basketball shooting performance in particular, in getting data at a high enough resolution, accuracy, and precision levels. Moreover, the specific analysis for example, mapping that provides the probability that a shot will be made as a function of hit location, angle and origin can be of substantial values for all potential users.

The systems and methods described herein are configured to provide a user with the ability to track the basketball's trajectory, specifically around the rim, in sub-cm resolution. Furthermore, the systems and methods are configured to locate the exact hit location of the shot at sub-cm accuracy and in real time (in other words, providing data in no more than 200 msec.). Moreover, the trajectory in the vicinity of the rim can provide a lot of value, e.g., whether it hit the backboard\rim, whether it was blocked (and if so, was it a legal or illegal blocking, i.e. "goaltending"), what was its origin (which requires that a sufficient section of the trajectory is tracked) and the like. It is noted that the hit location means the point at which the ball center crosses the rim plane, whether inside the rim or outside the rim. Therefore, even shots that hit the backboard or the rim and bounce outside can be tracked and resolved assuming enough data is obtained on the arc, as to where, theoretically (in other words, based on the origin and trajectory (arc angle and velocity), these shots would have crossed the rim plane, regardless of the rim location and/or the backboard. This way, the cluster obtained will be more accurate and provide more relevant data.

Accordingly and in an embodiment, provided herein is a computer-based system for providing key performance indicators (KPI) of a basketball player to a user, the system comprising: a transparent board having a front surface and a rear surface; a hoop operably coupled to the transparent board, wherein the hoop rim defines a plane that is perpendicular to the board; a sensing module coupled to the rear surface of the board, wherein the sensing module is adapted to trace a course of a ball over a predetermined voxel; and a processing module, in communication with at least one of the sensing module, the board and the rim, the processing module having a central processing unit (CPU) in communication with a non-volatile memory having thereon a processor-readable medium with a set of executable instructions configured to, when executed, cause the CPU to: track the course of the ball within the predetermined voxel; determine the location of the center of the ball; trace the ball center within the predetermined volume; determine the ball center location relative to the rim; determine the planar location on the rim plane where the ball center crosses; using a display, render the ball center course; and based on the ball center course, the rim and the plane, provide the user with a plurality of key performance indicators.

Figure 4:
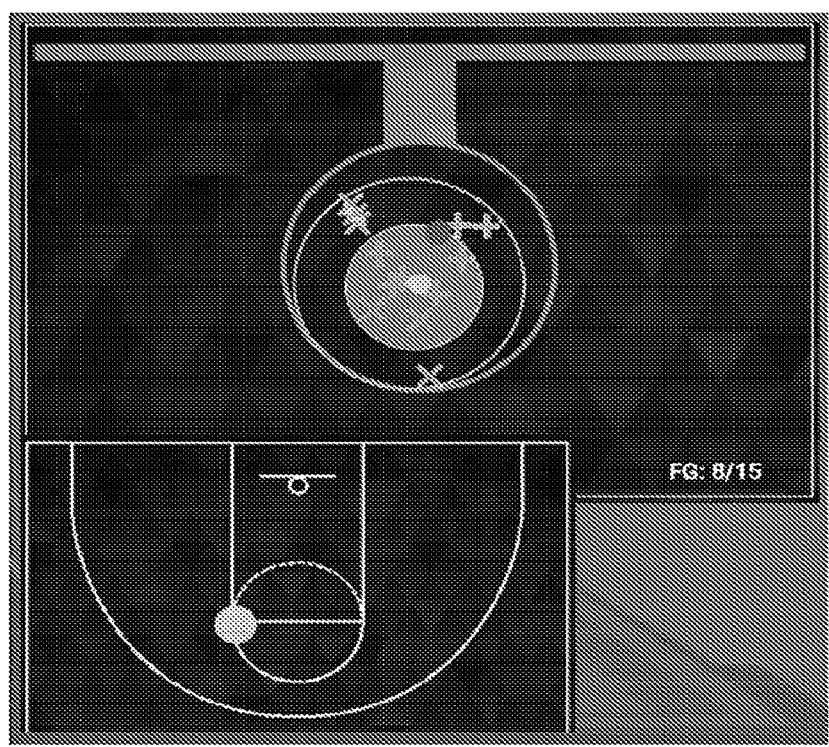
FIG. 4, illustrates output for a player showing hits and misses with calculated cluster and offset relative to an optimal hit point from a given origin on the key.
Figure 5:
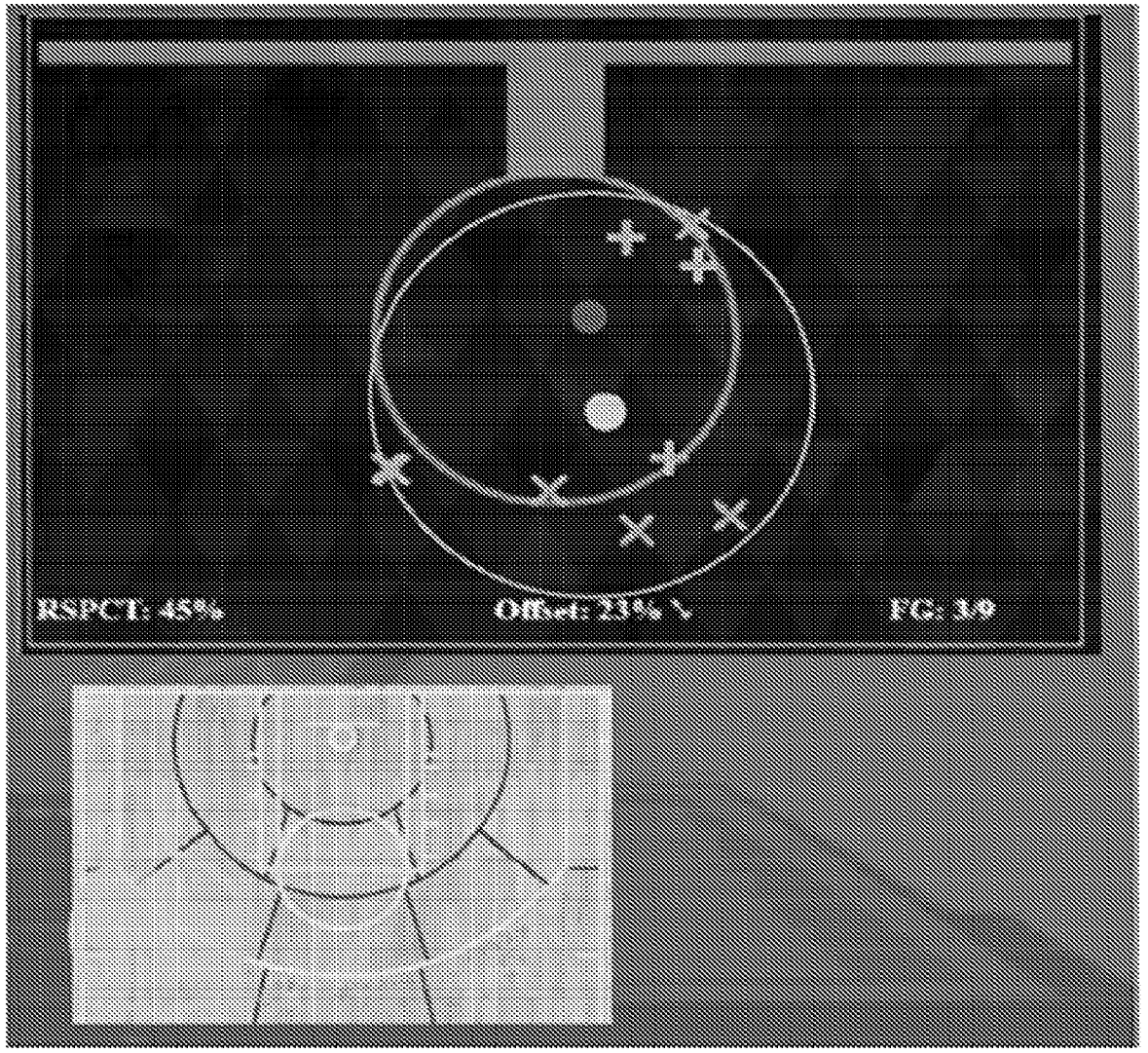
FIG. 5, illustrates output for a user showing hits and misses with calculated cluster and offset relative to an optimal hit point from a given origin on the key, as well as weighted cluster center.
Figure 6:
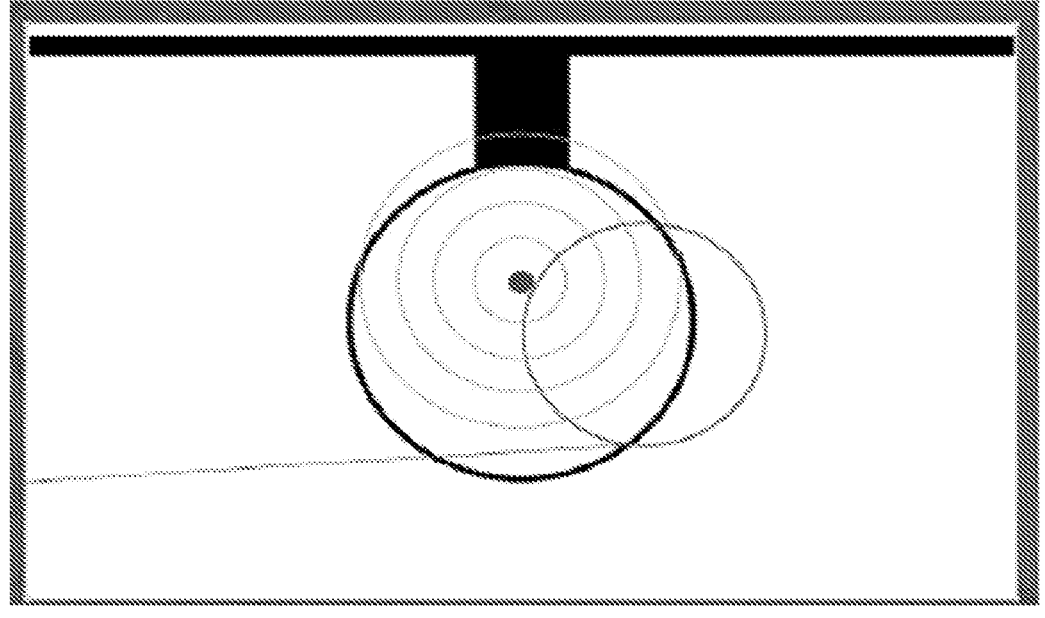
FIG. 6, illustrates output for improved grading.
Figure 7:
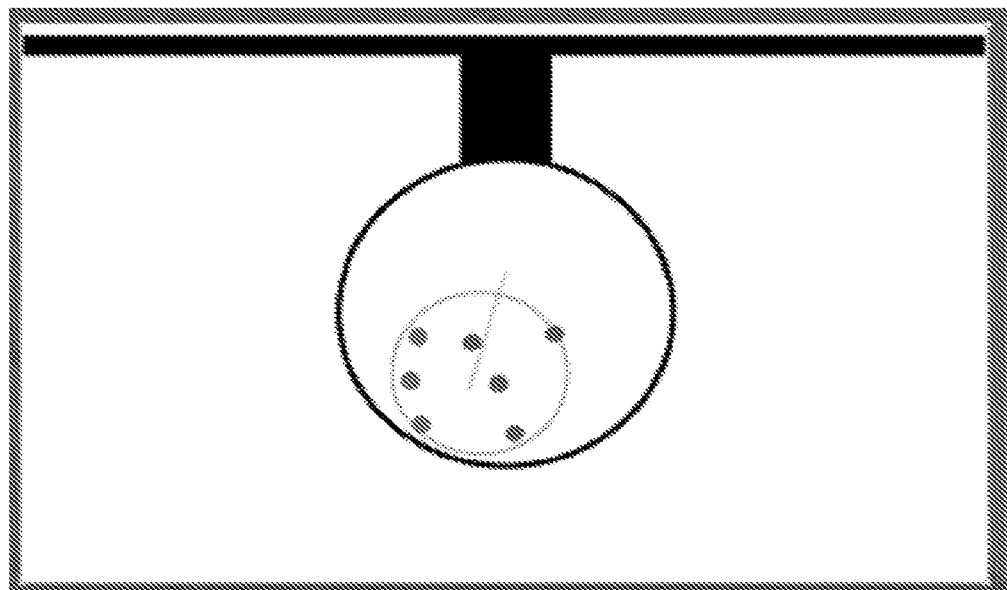
FIG. 7, illustrates an embodiment representing cluster and offset.

The key KPI used in the system and methods disclosed and claimed can be, for example; fractional number of shots within the volume that crossed the rim plane, the location where the ball center crossed the rim plane, a cluster size, the cluster offset from a predetermined point on the rim plane, ball center arc angle, the time where the ball passes the hoop's rim by over a user-defined threshold, or a combination of KPI's comprising one or more the foregoing. As illustrated, for example in FIGS. 1, and 4-7, cluster size refers to the smallest circle that contains the entire subset of shots that crossed the rim plane, whether hitting the rim or not (see e.g., FIG. 4, top), while the offset refers to the distance between the center of the cluster and a predetermined spot within the (hoop) rim plane (see e.g., FIG. 5). Additionally, the output can be separated to "natural grouping" represented by the portion of the cluster where individual shots are within a distance that is no more than 3 standard deviation (3STD) from the center of the cluster, and to outliers (those shots that are more then 3STD from the center (see e.g., FIG. 4).

The systems disclosed herein are configured to provide tracking the basketball's trajectory, specifically around the rim, in sub-cm accuracy, referring in an embodiment to the ability to detect and render the center of the ball in the voxel within no more than 10 mm of its (the ball center's) of its actual position. As used herein, the term "voxel" has a totally different meaning than in volume rendering, and refers to an elementary three-dimensional space element, or a volume sample.

In an embodiment, the sensing module (located for example above the rim and offset from the center), used in the system and methods disclosed and claimed can comprise an optic sensor, a proximity sensor, an acceleration sensor, or a sensor combination comprising the foregoing. For example, the optic sensor can be a LIDAR, referring, for example to the concepts of light detection and ranging, laser detection and ranging (ladar), laser radar, or optical radar further comprising optical detectors. Additionally, the optical sensor can comprise a digital camera, referring to refer to a device that is capable of image sensing means and focusing means, wherein the term "camera" refers to the concept of having a field of view extending about an optical axis for imaging passive reflected radiation from objects and a focal plane perpendicular to said optical axis. Other optical detectors are also contemplated.

In another embodiment, the sensor used can be a combination of various cameras, for example, a digital RGB camera, an IR camera(s) and IR Laser projector, which can be installed on the back of the backboard, "looking" through it (in case of a transparent backboard, see e.g., FIG. 13A), or above the basket, "peeking" above it on the backboard top edge (see e.g., FIG. 13B), in certain embodiments where the backboard is not transparent. In an embodiment, the camera array and the laser projector are installed very near the rim, in order to reach high enough accuracy and sensitivity. For example, a single sensor is configured to provide a combination of RGB for each pixel, with depth image, produced through IR optic elements in combination with flash/strobe, (yielding X,Y,Z coordinate values for each pixel). Both the pixel's RGB image and the IR depth sensing optics (which, in certain embodiments is the sole optic sensor used), are configured to have a predetermined FOV and no less than 90 Frames Per Second (FPS).

The sensor can be in electronic communication with the processing module (e.g., a computer), for example by a cable, whereby the processing module is adapted to extract the features that are pertinent to the task at hand, for example, refereeing, time management, player KPT collection or for that matter sport type (other than basketball, for example, soccer (on goal frame), volleyball (sensor operably coupled to the net), baseball (sensor behind Homeplate)), and may further comprise at least one of various filters (e.g., IR filters, or polarizing filters to reduce glare), external electromagnetic radiation emitters (e.g., JR lights to increase accuracy and depth sensing), accelerator(s) configured to detect backboard/rim vibration for improved calibration and officiating)

Additionally, the system may be adapted without connection to a grid power and may be powered with batteries or, where appropriate, solar panels. Furthermore, the system can be adapted to be remotely calibrated and monitored. In other words, the system can be distributed where the sensor(s) operate as a network node allowing for central data analysis using a backend management server in communication with a database, whereby analysis and rendering at the client side (the user display device) is done remotely (for example under subscription). It is contemplated that the system in an embodiment is at least partially an integral part of the backboard, whereby the sensors are embedded within the backboard. Additionally, the backboard itself may be adapted to be the display means for the data rendering.

Additionally, or alternatively, the sensors can be two cameras located on opposite ends of the board so that the field of view (FOV) of each covers the rim and about 1 m around it to each side, while the backboard protects the cameras from impact. The sensors (optical and others, e.g, accelerometers) can obtain images through the transparent backboard and be close enough to reach the required accuracy. It should be noted, that the sensor module can be configured to be robust enough to tolerate vibrations, reflections, distortions (e.g., due to imperfections and scratches on the backboard.

Other sensors that can be used are RFID tags inside the ball with an array of sensors that would triangulate the ball location at all time, or in the vicinity of the board and the rim. These and the aforementioned sensing modules, methods and system can be used in many other sports where the accuracy of ball placement within a region of interest is of value to users. For example soccer, baseball, hockey and the like.

Figure 11:
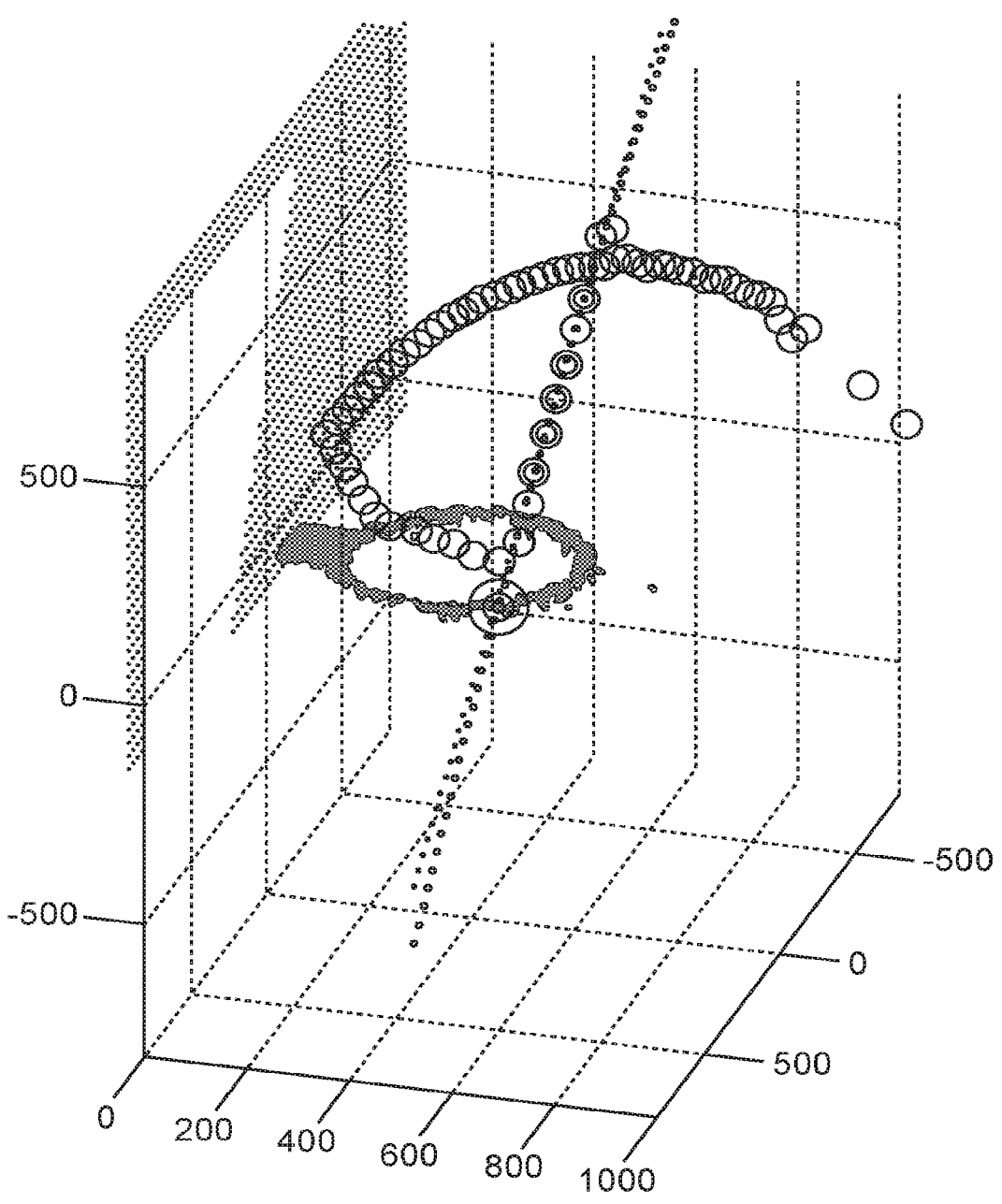
FIG. 11, illustrates sensor determination of a ball center that did hit the rim, resulting in a missed shot.
Figure 12:
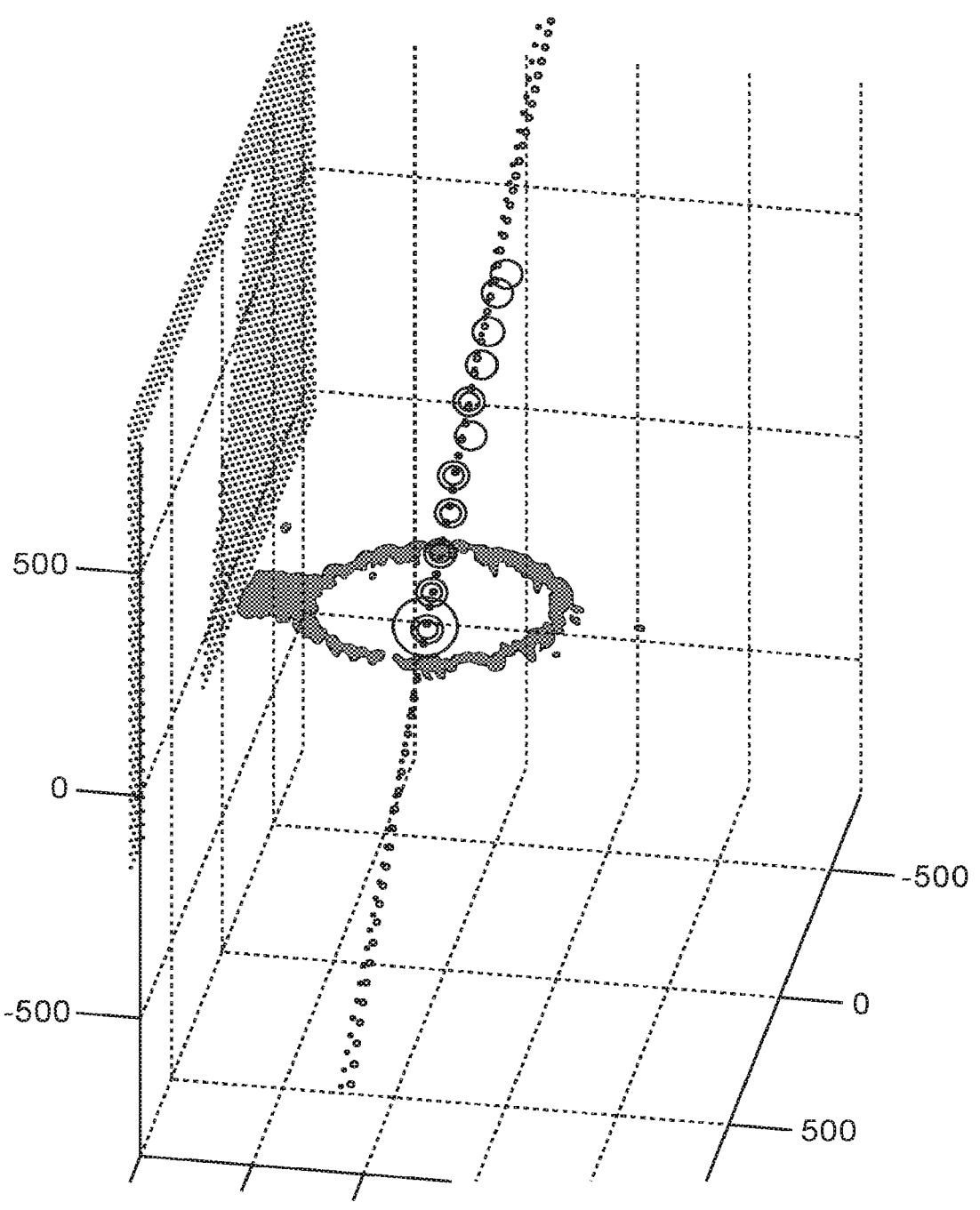
FIG. 12, illustrates sensor determination of a ball center that did not hit the rim, resulting in a hit shot and showing location where the ball center crosses the rim plane.

Further, the set of executable instructions used in the system and methods disclosed and claimed can be configured to trace the shot arc and/or arc angle, within the predetermined volume and use the traced shot to determine the origin of the shot and provide a shot origin-specific cluster and/or offset. As illustrated in FIGS. 2-5 and 11. As illustrated in FIGS. 11 and 12, the predetermined volume can be a cube defined by the backboard, and centered on the rim. In an embodiment, the systems and methods described herein provide for tracking a basketball's position in 3D coordinate system (see e.g., FIG. 11) in the final section of its flight. The final section can be modified based on the type and number of sensors used. This is done without adversely affecting the basketball game\practice, with high accuracy: (e.g., <1 cm error on 3 dimensions), while the ball is moving (and spinning) at up to 50 km\h, in a spherical volume having a radius of 1.5 m around the rim center (the spherical volume representing the voxel anywhere on the court and along the shot trajectory, not just around the rim)—with a delay of no more than 0.2 seconds (or 200 milliseconds-msec.).

The features extracted from the data collected can be at least one of Real exact hit point, Shot Made\Missed, Shot arc, Shot origin. Ball Spin during a shot, Whether, how many times, and when the shot hit the backboard, Whether, how many times, and when the shot bounced off the rim, in case the shot was deflected before arriving at the rim—Shot hitting point, the exact time the ball had completely passed through the rim, and ball deflection in relation to the arc apogee.

In an embodiment, illegal blocking can be detected and reported. Since the sensor is coupled to the board, plotting the ball trajectory will show oscillation that is parallel with the vibration direction. In an embodiment, an oscillating trajectory whereby the amplitude is over a predetermined threshold (specified by the user), while the ball center is at a distance of less than the ball radius from the hoop rim, indicates illegal goal tending and the system is configured to detect and report that illegal goaltending to a user.

To clarify, in the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory of the computing system. That memory may be local or remote. Computing system may also contain communication channels that allow the computing system to communicate with other processors and sensors over, for example, service bus.

Embodiments described herein may comprise or utilize a special purpose or general-purpose computer including computer hardware, such as, for example, one or more processors (e.g., central processing module, CPM) and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

The key KPI used in the systems and methods described herein can be, for example fractional number of shots within the voxel that crossed the rim plane, the location where the ball center crossed the rim plane, a cluster size, the cluster offset from a predetermined point on the rim plane, ball center arc angle, or a combination of KPI's comprising the foregoing. Other KPI's can be shooting As illustrated, for example in FIGS. 1 and 4, the cluster can be referred to as the diameter encompassing the location where the ball center crossed the (hoop) rim plane for all shots subset that entered the rim.

Figure 8:
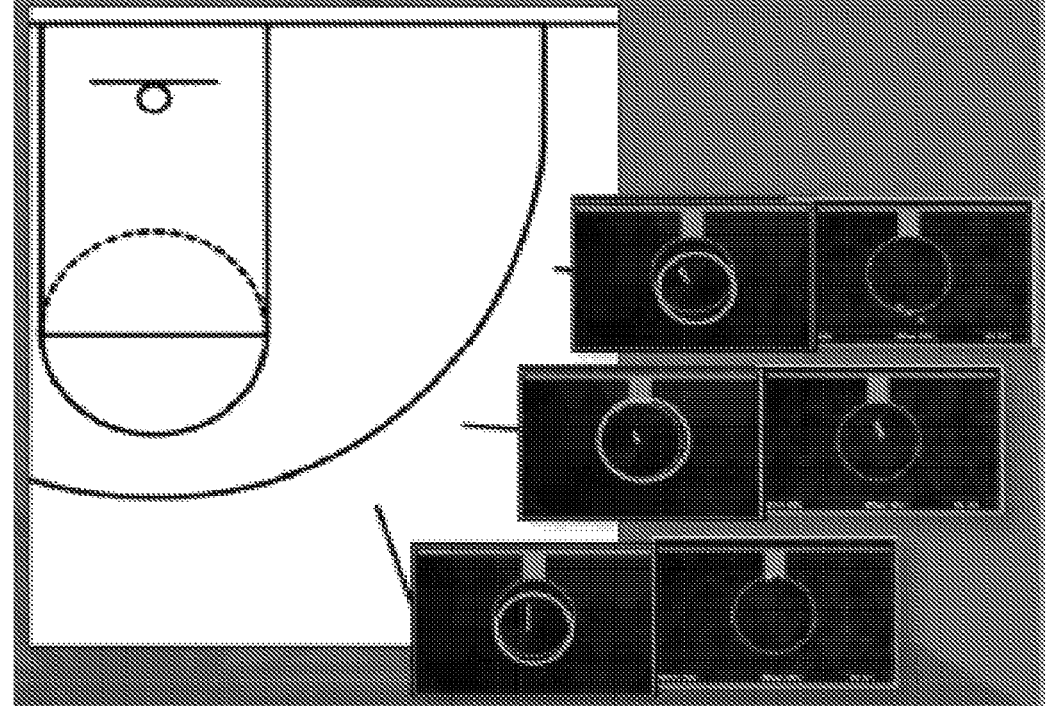
FIG. 8, illustrates an embodiment representing origin-dependent offset for a given player.
Figure 9:
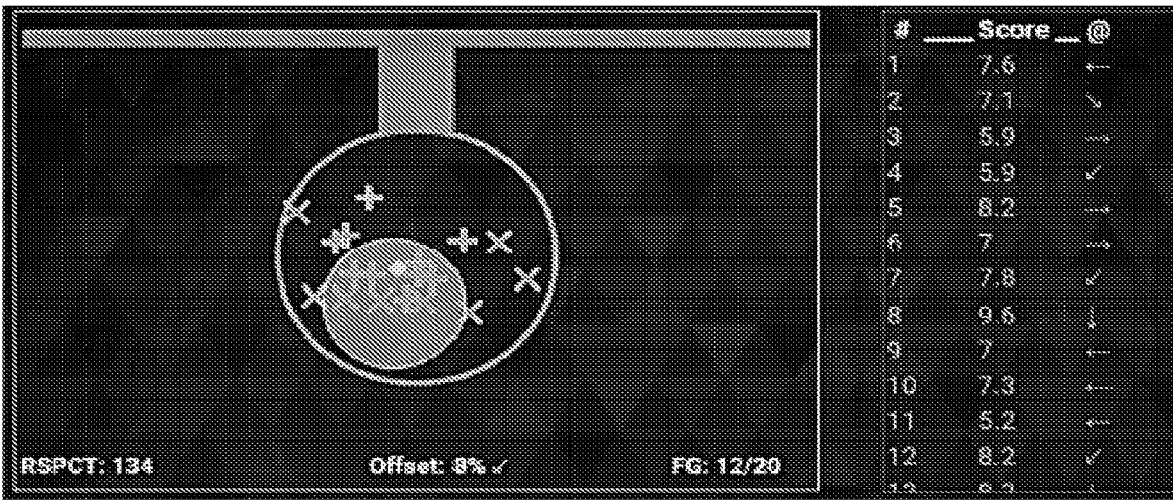
FIG. 9, illustrates calculated weighted cluster center with hits and misses.

Likewise, to be effective, it may be required to limit clusters and offset to a single point of origin, or an origin area. In an embodiment, the predetermined the predetermined point on the rim plane is shot origin specific and the actionable analyzed data (or, the extracted feature) for a given user (see e.g., FIGS. 2, 3) could be how to reduce cluster size (see e.g., FIG. 6), best shooting position for a given player (see e.g., FIG. 8) optimal hit location based on the origin area for shooting etc. In an embodiment, the system can be configured to provide a full trajectory of the ball that is based on partial trajectory, regardless of whether the trajectory has or has passed an apogee.

Figure 10A:
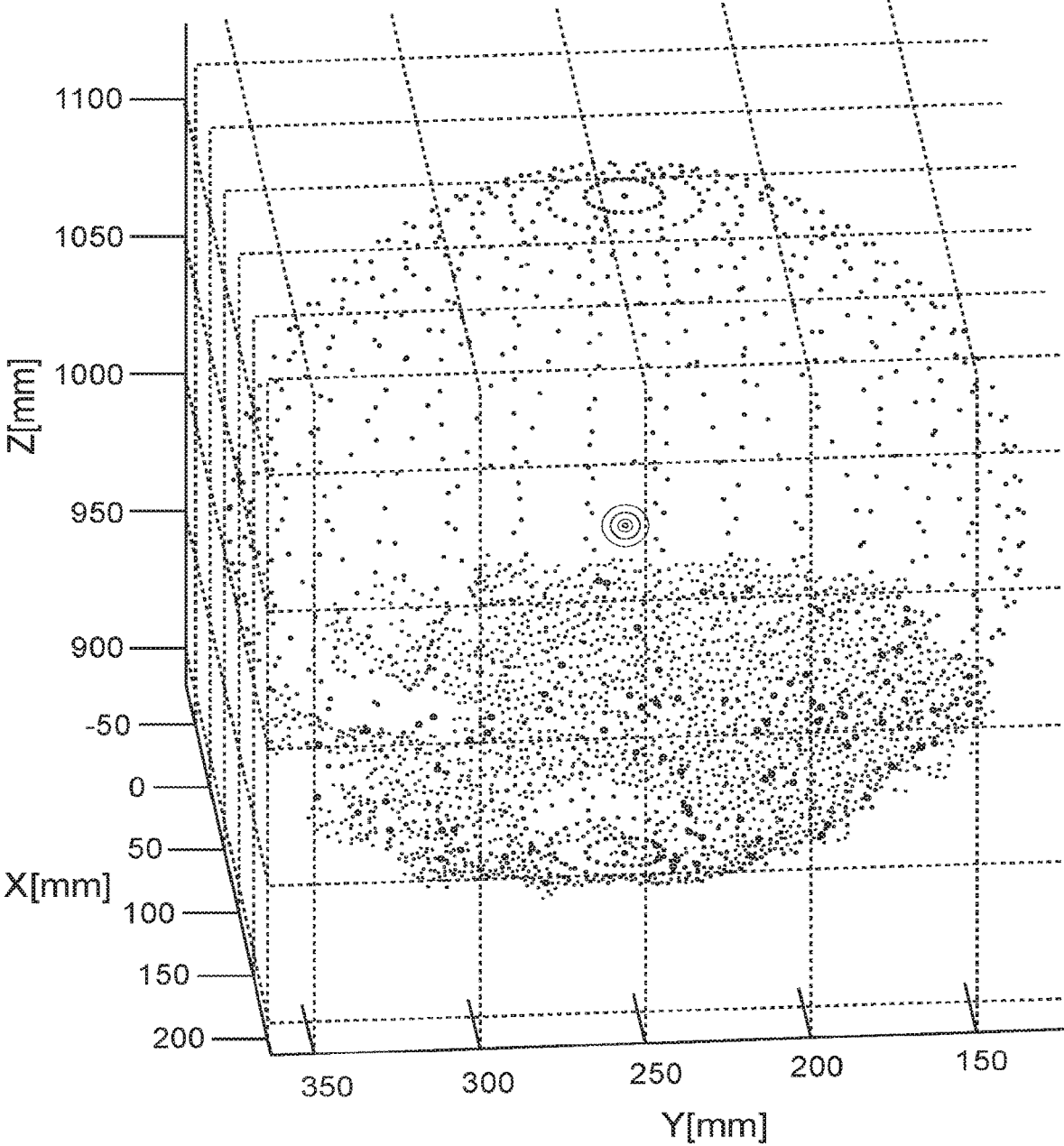
FIG. 10A, illustrates sensor determination of a ball center that did not hit the rim, with FIG. 10B illustrating sensor determination of a ball center that did hit the rim, showing deformation caused by the rim.
Figure 10B:
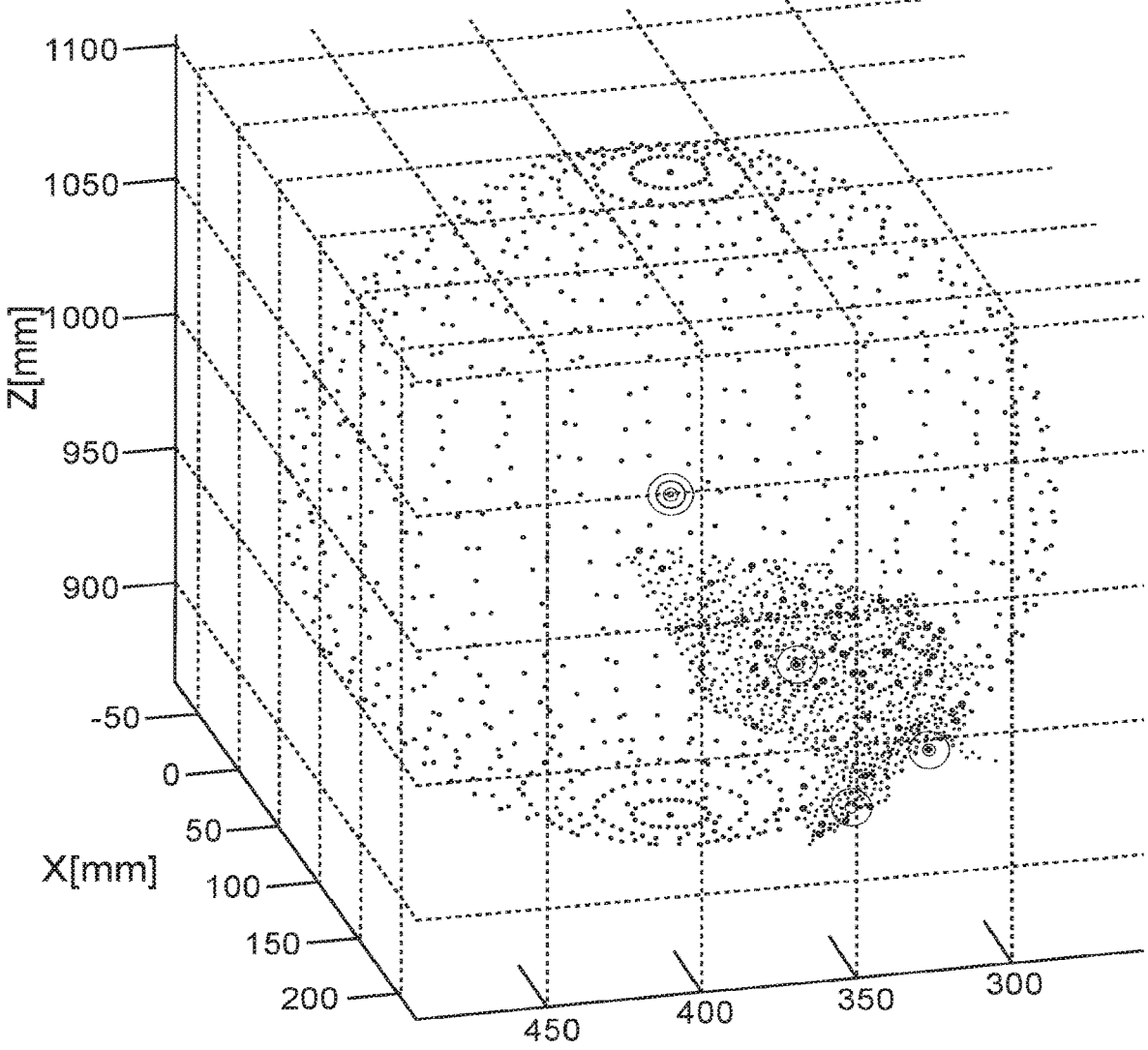

Furthermore, it may be advantageous to determine a weighted center for a given cluster from a given shooting origin or area (defined in an embodiment to be of a predetermined radius, e.g., about 1 m.). The weighted center can be calculated (see e.g., yellow dot FIGS. 4, 5), for example by giving higher weight to shots that crossed the rim plane without hitting the rim, as determined by the sensing module (see e.g., FIGS. 10A, and 11), than those shots that were determined by the sensing module to have crossed the rim plane with hitting the rim (see e.g., FIG. 10B, 11).

In an embodiment, the system is configured to undergo at least one of continuous calibration and automatic calibration, referring to the process of determining calibration parameters, which allow the sensor's (or sensors') output or signal to be related quantitatively to ball location within the voxel (e.g., by precisely determining the location of the camera relative to the hoop rim), with a sub-cm degree of accuracy. In some embodiments, the calibration parameter is at least one of temperature, distance, sensor type, sensor location on the backboard, number of sensors, backboard size and shape, transparency, haze, lighting elements and the like.

Improved calibration is achieved in an embodiment by, for example; detecting the surface beneath the rim, and using its plane to improve the accuracy of vertical axis (Z direction) detection. Also, using the trajectory of the shots to determine the exact correct axes, where a shot's behavior on the horizontal and vertical axes is known, such that a shot having sufficient number of accurate enough samples can be used to find the exact vertical axis. Improved calibration con be done in an embodiment by identifying glass distortions—when installed behind the basket's glass, use the floor and rim data to detect distortions caused by the backboard's glass, and take them into account when tracking the ball. Also, identifying imperfect rims—there are inaccuracies in the installation of the rims themselves. Some rims may not be completely level (are angled), some may be offset by a few mms from the desired location. Calibration can take this issue into account by, for example, solving rim offset by taking only the rim as the reference point, since the rim is what the players are aiming for. Solving issues relating to unleveled rims by finding the accurate real-world axes from the surface beneath the rim and the ball's trajectory, and using a virtually "leveled" rim as reference. Additionally, the system can be adapted to warn the users in case the system finds that the rim is angled beyond a certain threshold angle.

Example of calibration modes can be:

One-shot:
Run calibration once at set up, calibration values don't change as long as the sensor doesn't move.

Continuous:
Run initial calibration, following that, re-run calibration on regular time intervals, or whenever there's no ball in the frame. Its advantages:
Continually monitor and improve the calibration quality
Compensate for slight movements in the sensor (not expected)
Detect movement of sensor (and compensate for that)
Detect other events related to the rim, such as a player moving the rim Shot-adjusted:
Once a shot is tracked, the system can use it to further improve calibration:
The trajectory of the ball provides very accurate indication on the gravity's direction, and that can be used to improve the estimation of the Z axis in relation to the sensor.
The system may therefore include an adjustment mode that periodically uses a shots' data to improve the calibration.

Auto calibration on system powerup
Once the system powers up, it can perform calibration automatically, without human interference.
This is useful e.g. in case the basket had been moved, folded and reopened, etc.

During "live runs" the objective is to accurately detect the ball path (trajectory) in the sensor's FOV. Implementation can comprise, for example at leasts one of:
Using only the depth image
Take the rim plane from calibration data Filter all points below the rim plane—leaving only the ball, possibly player hands, and noise
Clean noise (e.g., using size filter)
Identify the points that belong to the ball
Discern between ball and players' hands
Determine the ball center location
From the series of ball locations
Determine which locations belong to the "first leg"—the shot itself, before hitting the rim, and which samples are following "legs"
Calculate the trajectory that best fits those recovered data points
Determine the hit location—where that trajectory of the first leg crosses the rim's plane
Determine the rest of the shot's parameters—arc, origin, made\missed, etc.
In the origin's calculation take into account the dimensions of the backboard:
When installed on the backboard, the FOV of the sensor doesn't always include all of the backboard. In case of a "bank shot" coming off the backboard, the system may only detect the ball after the hit—therefore when calculating the shot's origin using extrapolation backwards, a test is needed to see if the trajectory intersects with the board, and in such a case, calculate the expected trajectory before the board hit.
Optimizations for predicting expected ball locations before the ball actually arrives at the vicinity of the rim (e.g., more the 2 m radius from the rim center)
Adapting the algorithm to inputs from multiple sensors—receive sets of points from 2 different sensors on the same basket, and using the 2 sets to:
Validate each sensor's accuracy
Create larger overall FOV
Create more samples per shot—both from the larger FOV and the larger number of samples inside that FOV
Reduce risk of obstruction, in case a player's hand is between the ball and sensor The term "module" is used herein to refer to software computer program code and/or any hardware or circuitry utilized to provide the functionality attributed to the module. Further, the term "module" or "component" can also refer to software objects or routines that execute on the computing system. The different components, modules, engines, and services described herein may be implemented as objects or processes that execute on the computing system (e.g., as separate threads).

Further, the CPM may be operably coupled to the various modules and components with appropriate circuitry, may also be used herein, the term(s) "operably coupled to", "coupled to", and/or "coupling" includes direct coupling between items and/or indirect coupling between items via an intervening item (e.g., an item includes, but is not limited to, a component, an element, a circuit, an engine, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "central processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributed (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

In an embodiment, the methods provided herein are implementable in the systems described and claimed. Accordingly, provided herein is a method of providing a user with a key performance indicator of a basketball player, implementable in a system comprising a transparent board having a front surface and a rear surface; a hoop operably coupled to the transparent board, wherein the hoop rim defines a plane that is perpendicular to the board; a sensing module coupled to the rear surface of the board, wherein the sensing module is adapted to trace a course of a ball over a predetermined volume; and a processing module, in communication with the sensing module and/or the board and/or the rim, the processing module having a central processing unit in communication with a non-volatile memory having thereon a processor-readable medium with a set of executable instructions configured to: track the course of the ball within the predetermined volume, determine the location of the center of the ball, trace the ball center within the predetermined volume, determine the ball center location relative to the rim, determine the planar location on the rim plane where the ball center crosses, render the ball center course, and based on the ball center course, the rim and the plane, provide the player with a plurality of key performance indicators, the method comprising: tracking a ball course in a predetermined volume; determining the ball temporospatial origin; calculating ball arc; determining a location where the ball center crosses the rim plane; and based on the ball center course, the rim and the plane, provide the player with a plurality of key performance indicators.

Also, the method of providing a user with a key performance indicator of a basketball player, implementable in the systems described herein, can further comprise tracking a subset of shots from a single player at a specific origin over a predetermined period and determining a change in the clusters diameter. In other words, the systems and methods described herein can be used to monitor the improvement of a player. It shall be noted that storing the analyzed data with time stamp metadata on a back-end server with the appropriate memory, and later cross-referencing the stored data with time stamped digital images, may be used to provide near real time analysis of a player within a game. Likewise, the methods described can further comprise determining a change in the offset (again, either improvement, fatigue set on etc.).

The systems and methods described herein can be used to track a subset of shots with the same origin for a given player and used to determine a set of arcs and calculate center mass of the arc, wherein the combination of shot origin location and the center mass of the arc can be used to determine the optimal hit location within the rim plane.

In yet another embodiment, provided herein is a kit capable of being assembled to provide the systems described herein. The kit can comprise, for example, the processing module, the sensing module, the transparent backboard marked as to the proper location for the sensing module, a rim, and instructions for proper assembly of the system. The processing module may further comprise a transceiver configured to provide communication with a back-end content management server that would provide the data analysis and transmit the analyzed data back to a display of the user. The display can be, for example, a mobile communication device and the like.

The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the network(s) includes one or more network). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The term "system" shall also be taken to include any collection of systems or sub-systems that individually or jointly execute a set, or multiple sets, of instructions to perform one or more functions. Also, the term "system" refers to a logical assembly arrangement of multiple devices, and is not restricted to an arrangement wherein all of the component devices are in the same housing.

Accordingly and in an embodiment, provided herein is a system for providing key performance indicators (KPI) of a basketball player to a user, the system comprising: a transparent board having a front surface and a rear surface; a hoop operably coupled to the transparent board, wherein the hoop rim defines a plane that is perpendicular to the board, a sensing module coupled to the rear surface of the board, wherein the sensing module is adapted to trace a course of a ball over a predetermined voxel; and a processing module, in communication with at least one of the sensing module, the board and the rim, the processing module having a central processing unit in communication with a non-volatile memory having thereon a processor-readable medium with a set of executable instructions configured to, when executed a processor to: track the course of the ball within the predetermined voxel; determine the location of the center of the ball; trace the ball center within the predetermined voxel; determine the ball center location relative to the hoop rim; determine the planar location on the rim plane where the ball center crosses; using a display, render the ball center course; and based on the ball center course, the rim and the plane, provide the user with a plurality of key performance indicators related to the player, wherein (i) the key KPI is: fractional number of shots within the volume that crossed the rim plane, the location where the ball center crossed the rim plane, a cluster size, the cluster offset from a predetermined point on the hoop rim plane, ball center arc angle, or a combination of KPI's comprising the foregoing, wherein (ii) the sensing module comprises an optic sensor, a proximity sensor, an acceleration sensor, or a sensor combination comprising the foregoing, wherein (iii) the set of executable instructions is further configured to, when executed, cause the processor to: determine the origin of the shot and provide at least one of a shot origin-specific cluster and offset, (iv) the cluster is a diameter encompassing the location where the ball center crossed the hoop rim's plane, (v) the predetermined point on the hoop rim plane is shot origin specific, (vi) the offset is the distance between the predetermined point on the rim plane and a weighted cluster center, (vii) the origin of the shot is of a predetermined radius, wherein (viii) the sensor module is located above the hoop rim's plane, (ix) the sensor module is located off center relative to the hoop rim, the system further comprising (x) a basketball game time administration means in communication with the central processing module and wherein the set of executable instructions is further configured to cause the processor, when executed to: determine when the time when the entire ball has passed the rim's plane; and output the time to the basketball game time administration means, (xi) the basketball game time administration means is at least one of a shot-clock, an audible marker (e.g., a buzzer), and a visual marker (e.g., a light or the backboard frame if it lights up).

In another embodiment, provided herein is a method of providing a user with a key performance indicator of a basketball player, implementable in a computerized system with a display, comprising a transparent board having a front surface and a rear surface; a hoop operably coupled to the transparent board, wherein the hoop rim defines a plane that is perpendicular to the board; a sensing module coupled to the rear surface of the board, wherein the sensing module is adapted to trace a course of a ball over a predetermined voxel; and a processing module, in communication with at least one of the display, the sensing module, the board and the rim, the processing module having a central processing unit in communication with a non-volatile memory having thereon a processor-readable medium with a set of executable instructions configured to, when executed, cause a processor to: track the course of the ball within the predetermined voxel, determine the location of the center of the ball, trace the ball center within the predetermined voxel, determine the ball center location relative to the hoop, determine the planar location on the rim plane where the ball center crosses, render the ball center course, and based on the ball center course, the hoop rim and the plane, provide the user with a plurality of key performance indicators, the method comprising: tracking a ball course in a predetermined voxel; determining the ball temporospatial origin; calculating ball arc; determining a location where the ball center crosses the rim plane; and based on the ball center course, the rim and the plane, provide the user with a plurality of key performance indicators, wherein (xii) the key KPI is: fractional number of shots within the volume that crossed the rim plane, the location where the ball center crossed the rim plane, a cluster size, the cluster offset from a predetermined point on the hoop rim plane, ball center arc angle, or a combination of KPI's comprising the foregoing, wherein (xiii) the sensing module comprises an optic sensor, a proximity sensor, an acceleration sensor, or a sensor combination comprising the foregoing, wherein (xiv) the set of executable instructions is further configured to, when executed, cause the processor to: determine the origin of the shot and provide at least one of a shot origin-specific cluster and offset, (xv) the cluster is a diameter encompassing the location where the ball center crossed the hoop rim's plane, (xvi) the predetermined point on the hoop rim plane is shot origin specific, (xvii) the offset is the distance between the predetermined point on the hoop rim's plane and a weighted cluster center, (xviii) the origin of the shot is of a predetermined radius, the method further comprising (xix) tracking a subset of shots from a single player at a specific origin over a predetermined period and determining a change in the clusters diameter, and (xx) further comprising determining a change in the offset, (xxi) the system further comprises a basketball game time administration means in communication with the central processing module the method further comprising: determining when the time when the entire ball has passed the rim's plane; and providing the time to the basketball game time administration means, (xxii) the basketball game time administration means is at least one of a shot-clock, an audible marker, and a visual marker.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

The invention claimed is:

1. A system for providing performance indicators of a basketball player to a user, the system comprising:
   a. a backboard having a front surface and a rear surface;
   b. a hoop rim operably coupled to the backboard, wherein the hoop rim defines a plane that is perpendicular to the backboard;
   c. a sensing module, wherein the sensing module comprises at least one depth sensor yielding X, Y, Z coordinate values representing points on a surface of a basketball within a field of view the depth sensor to trace a course of the basketball over a predetermined voxel; and
   d. a processing module, in communication with at least one of the sensing module, the backboard and the hoop rim, the processing module having a central processing unit in communication with a non-volatile memory having thereon a processor-readable medium with a set of executable instructions configured to, when executed by at least one processor:

i. determine that a ball is within the predetermined voxel, ii. determine, using the X, Y, Z coordinate values representing points on a surface of the ball within the field of view of the depth sensor, a location of the ball center, iii. determine, the ball center location relative to the hoop rim, iv. determine a series of ball center positions to trace the ball within the predetermined voxel;

v. determine a planar location on the hoop rim plane where the ball center crosses, vi. calculate an arc of the ball;

vii. recognize, based on a course of the ball center, the hoop rim and the plane, a cluster of shots;

viii. determine, based on a predetermined point on the hoop rim plane, an offset of the shot cluster, wherein the offset is the distance between the predetermined point on the hoop rim plane and a weighted cluster center; and ix. provide the user, based on the course of the ball center, the hoop rim and the plane, performance indicators related to the cluster of shots.

2. The system of claim 1, wherein the sensing module is located at the rear surface of the backboard, or at a top of the backboard, or is located above the hoop rim plane and/or off-center relative to the hoop rim.

3. The system of claim 1, further comprising a basketball game time administration means in communication with the processing module, and wherein the set of executable instructions is further configured, when executed, to cause the at least one processor to:

a. determine the ball center location relative to the hoop rim;

b. determine the planar location on the hoop rim plane where the ball center crosses the hoop rim;

c. plot a time versus location of the ball center in relation to the hoop rim; and d. once the ball passes the hoop rim beyond a threshold defined by the user, communicate one or more of a time the ball passes the threshold, a ball deflection, the ball center passing an apex, the ball touching the backboard, the ball touching the hoop rim, and the ball center passing above a cylinder of the hoop rim to the basketball game time administration means.

4. The system of claim 1, wherein the predetermined voxel is proximate a hoop rim center and parameters of a shot include one or more of arc, origin, made/missed, exact hit point, ball spin, backboard contact, hoop rim contact, deflection, and time the ball completely passed through the hoop rim.

5. The system of claim 1, wherein the backboard is transparent and the sensing module is located behind the backboard.

6. The system of claim 1, wherein the depth sensor is chosen from one or more of an IR depth sensor, an IR optical sensor with flash/strobe, a combination of RGB camera, an IR camera and an IR Laser projector LIDAR, Radar, laser scanning, and a polarization-based depth sensor.

7. The system of claim 1, further comprising:

providing the user, based on each of the courses of the ball center, the hoop rim and the plane, one or more performance indicators related to the player based on an individual shot.

8. The system of claim 7, further comprising determining an origin of a shot based on the course of the ball over the predetermined voxel.

9. The system of claim 7, wherein the executable instructions are configured to further determine an origin of a shot, a shot cluster, or a cluster offset.

10. The system of claim 7, wherein a performance indicator is chosen from one or more of a fractional number of shots within a volume that crossed the hoop rim plane, a location where the ball center crossed the hoop rim plane, a size of a cluster of shots, an offset of the cluster of shots from a predetermined point on the hoop rim plane, or a ball center arc angle.

11. A method of providing a user with a performance indicator of a basketball player, implementable in a computerized system with a display, comprising:

a backboard having a front surface and a rear surface;

a hoop rim operably coupled to the backboard, wherein the hoop rim defines a plane that is substantially perpendicular to the backboard;

a sensing module, wherein the sensing module comprises at least one depth sensor yielding X, Y, Z coordinate values representing points on a surface of a basketball within a field of view of the depth sensor to trace a course of the basketball over a predetermined voxel; and a processing module, in communication with at least one of the display, the sensing module, the backboard and the hoop rim, the processing module having a central processing unit in communication with a non-volatile memory having thereon a processor-readable medium with a set of executable instructions configured to, when executed, cause a processor to perform a method comprising:

determining that a ball is within the predetermined voxel, determining, using the X, Y, Z coordinate values representing points on a surface of the ball within the field of view of the depth sensor, a location of a ball center;

determining the ball center location relative to the hoop rim;

determining a series of ball center positions to trace the ball within the predetermined voxel;

determining a planar location on the hoop rim plane where the ball center crosses;

calculating an arc of the ball;

recognizing, based on a course of the ball center, the hoop rim and the plane, a cluster of shots;

determining, based on a predetermined point on the hoop rim plane, an offset of the cluster of shots, wherein the offset is the distance between the predetermined point on the hoop rim plane and a weighted cluster center; and providing the user, based on the course of the ball center, the hoop rim and the plane, performance indicators related to the cluster of shots.

12. The method of claim 11, wherein the sensing module comprises at least one of an optic sensor, a proximity sensor, an acceleration sensor, an additional depth sensor, or a sensor combination comprising the foregoing.

13. The method of claim 11, wherein the system further comprises a basketball game time administration means in communication with the processing module, the method further comprising:

a. determining the ball center location relative to the hoop rim;

b. determining the planar location on the hoop rim plane where the ball center crosses the hoop rim;

c. plotting a time versus location of the ball center in relation to the hoop rim; and d. once the ball passes the hoop rim beyond a threshold defined by the user, communicating one or more of a time the ball passes the threshold, a ball deflection, the ball center passing an apex, the ball touching the backboard, the ball touching the hoop rim, and the ball center passing above a cylinder of the hoop rim to the basketball game time administration means.

14. The method of claim 11, further comprising:

providing the user, based on each of the courses of the ball center, the hoop rim and the plane, one or more performance indicators related to the player based on an individual shot.

15. The method of claim 14, wherein the performance indicator is chosen from one or more of a fractional number of shots within a volume that crossed the hoop rim plane, a location where the ball center crossed the hoop rim plane, a size of a cluster of shots, an offset of the cluster of shots from a predetermined point on the hoop rim plane, or a ball center arc angle.

16. The method of claim 14, wherein the predetermined point on the hoop rim plane is shot origin specific.

\* \* \* \* \*